US012067925B2

(12) United States Patent
Yang et al.

(10) Patent No.: US 12,067,925 B2
(45) Date of Patent: Aug. 20, 2024

(54) DISPLAY PANEL AND ELECTRONIC TERMINAL

(71) Applicant: WUHAN CHINA STAR OPTOELECTRONICS TECHNOLOGY CO., LTD., Hubei (CN)

(72) Inventors: Liu Yang, Hubei (CN); Qiang Gong, Hubei (CN); Mang Zhao, Hubei (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 18/149,027

(22) Filed: Dec. 30, 2022

(65) Prior Publication Data

US 2024/0212559 A1 Jun. 27, 2024

(30) Foreign Application Priority Data

Dec. 26, 2022 (CN) ......................... 202211679139.4

(51) Int. Cl.
*G09G 3/20* (2006.01)

(52) U.S. Cl.
CPC ... *G09G 3/2074* (2013.01); *G09G 2300/0452* (2013.01); *G09G 2310/0202* (2013.01); *G09G 2310/0297* (2013.01); *G09G 2310/08* (2013.01); *G09G 2320/0626* (2013.01); *G09G 2320/0666* (2013.01)

(58) Field of Classification Search
CPC ......... G09G 3/2074; G09G 2300/0452; G09G 2310/0202; G09G 2310/0297; G09G 2310/08; G09G 2320/0626; G09G 2320/0666; G09G 3/3648
See application file for complete search history.

(56) References Cited

U.S. PATENT DOCUMENTS

2013/0106826 A1* 5/2013 Zhou ........................ G09G 3/36 345/212
2018/0151145 A1* 5/2018 Lee .......................... G09G 5/02
2020/0201130 A1* 6/2020 Qiao .................... G09G 3/3688
2023/0306928 A1* 9/2023 Lim ....................... G09G 5/227

* cited by examiner

*Primary Examiner* — Hang Lin
(74) *Attorney, Agent, or Firm* — PV IP PC; Wei Te Chung; Zhigang Ma

(57) ABSTRACT

Provided are a display panel and an electronic terminal, including pixel units arranged along row and column directions. The pixel unit includes sub-pixels of different colors arranged along the row direction. In a first mode, two adjacent groups of pixel units are simultaneously turned on, and the sub-pixels of a same color in two adjacent columns of pixel units display a same gray scale. In a second mode, a plurality of rows of pixel units are turned on sequentially, and each sub-pixel in a plurality of columns of pixel units displays a corresponding gray scale. The refresh rate of the first mode is greater than that of the second mode, and the resolution of the first mode is smaller than that of the second mode. This shortens the time required for all rows of pixel units to be turned on, thereby increasing the refresh rate.

18 Claims, 5 Drawing Sheets

DISPLAY PANEL AND ELECTRONIC TERMINAL

CROSS REFERENCE TO RELATED APPLICATION

This application claims priority to China Patent Application No. 202211679139.4, filed on Dec. 26, 2022, which is incorporated herein by reference in its entirety.

TECHNICAL FIELD

The present invention relates to display technologies, especially display panel manufacturing technologies, and more particularly to a display panel and an electronic terminal.

BACKGROUND

Currently, display panels are usually driven by line-by-line scanning to display the screen. For example, the first row of scan lines is turned on first and data lines charge the first row of pixel electrodes, then the second row of scan lines is turned on and the first row of scan lines is turned off, and data lines charge the second row of pixel electrodes, and so on, until the last row of pixel electrodes is charged. Therefore, for large-size or high-resolution display panels, the refresh rate of the display panels is low because of an increase in the number of pixel electrodes. It is not beneficial to the displaying of dynamic images.

Therefore, the existing large-size or high-resolution display panels have the afore-described drawbacks and need to be improved.

SUMMARY

Embodiments of the present invention provide a display panel and an electronic terminal for solving the technical problem that the refresh rate of the existing large-size or high-resolution display panel is so low that it is not beneficial to display dynamic images.

The display panel provided in an embodiment of the present invention includes:

a plurality of pixel units, arranged along a row direction and a column direction, in which the row direction intersects the column direction, and the pixel unit includes a plurality of sub-pixels of different colors arranged along the row direction, wherein in a first mode, at least two adjacent rows of pixel units 10 are simultaneously turned on, and the sub-pixels of a same color in at least two adjacent columns of pixel units display a same gray scale, wherein in a second mode, the plurality of rows of pixel units are turned on sequentially, and each sub-pixel in a plurality of columns of pixel units displays a corresponding gray scale, wherein a refresh rate of the first mode is greater than the refresh rate of the second mode, and a resolution of the first mode is smaller than the resolution of the second mode.

In an embodiment, the refresh rate and the resolution of the display panel are negatively correlated.

In an embodiment, the display panel further includes:

a plurality of gate lines, in which each row of pixel units are electrically connected to a corresponding gate line; and a plurality of data lines, in which each sub-pixel in each column of pixel units is electrically connected to a corresponding data line, wherein in the first mode, at least two adjacent gate lines transmit a same gate signal, and at least two adjacent data lines transmit a same data signal.

In an embodiment, the display panel further includes:

a source driver;

a plurality of multiplexing transistors, in which one of a source and a drain of the multiplexing transistor is electrically connected to the corresponding data line;

a plurality of source lines, electrically connected to the source driver, in which the other one of the source and the drain of at least two multiplexing transistors corresponding to the sub-pixels of the same color in at least two adjacent groups of pixel units arranged along the row direction is electrically connected to a same source line; and a plurality of selection lines, in which a gate of at least two multiplexing transistors corresponding to the sub-pixels of the same color in at least two adjacent groups of pixel units arranged along the row direction is electrically connected to different selection lines.

In an embodiment, in the first mode, at least two selection lines corresponding to the sub-pixels of the same color in at least two adjacent columns of pixel units transmit a same selection signal, wherein in the second mode, at least two selection lines corresponding to the sub-pixels of the same color in at least two adjacent rows of pixel units transmit different selection signals.

In an embodiment, each gate signal includes an effective gate pulse, and the effective gate pulse is used to control a corresponding group of pixel units to be turned on, wherein a width of an effective clock pulse of a clock signal used to generate a corresponding effective gate pulse in the first mode is less than the width of the effective clock pulse in the second mode.

In an embodiment, the width of the effective clock pulse in the first mode is k times the width of the effective clock pulse in the second mode, where k is greater than 0 and less than 1, and k is related to the resolution of the first mode and the resolution of the second mode.

In an embodiment, in the first mode, the selection signal transmitted by at least two selection lines corresponding to the sub-pixels of the same color in at least two adjacent columns of pixel units is used to control at least two corresponding multiplexing transistors to be turned on persistently.

In an embodiment, in the first mode, multiple rows of pixel units arranged consecutively serve as a pixel unit group, and a plurality of pixel unit groups are scanned group by group, wherein in the second mode, the plurality of pixel units are scanned row by row, and each data line transmits a corresponding data signal.

In an embodiment, the display panel further includes:

a plurality of cascaded gate drive units, in which the gate line is electrically connected between a corresponding gate drive unit and a corresponding pixel unit; and a plurality of clock lines, in which the clock line is electrically connected to at least one corresponding gate drive unit, and two adjacent rows of pixel units correspond to different clock lines, wherein in the first mode, at least two clock lines corresponding to at least two adjacent rows of pixel units transmit a same clock signal, wherein in the second mode, the plurality of clock lines transmit different clock signals.

In an embodiment, a total number of rows of pixel units is an even number, and a total number of columns of pixel units is an even number, wherein in the first mode, at least a p-th row of pixel units and a (p+1)-th row of pixel units that are adjacent to each other are simultaneously turned on, and at least two sub-pixels of the same color in at least a q-th column of pixel units and a (q+1)-th column of pixel units that are adjacent to each other display the same gray scale, where both p and q are odd numbers.

An embodiment of the present invention provides an electronic terminal, which includes a display panel, which includes:

a plurality of pixel units, arranged along a row direction and a column direction, in which the row direction intersects the column direction, and the pixel unit includes a plurality of sub-pixels of different colors arranged along the row direction, wherein in a first mode, at least two adjacent rows of pixel units 10 are simultaneously turned on, and the sub-pixels of a same color in at least two adjacent columns of pixel units display a same gray scale, wherein in a second mode, the plurality of rows of pixel units are turned on sequentially, and each sub-pixel in a plurality of columns of pixel units displays a corresponding gray scale, wherein a refresh rate of the first mode is greater than the refresh rate of the second mode, and a resolution of the first mode is smaller than the resolution of the second mode.

In an embodiment, the refresh rate and the resolution of the display panel are negatively correlated.

In an embodiment, the display panel further includes:

a plurality of gate lines, in which each row of pixel units are electrically connected to a corresponding gate line; and a plurality of data lines, in which each sub-pixel in each column of pixel units is electrically connected to a corresponding data line, wherein in the first mode, at least two adjacent gate lines transmit a same gate signal, and at least two adjacent data lines transmit a same data signal.

In an embodiment, the display panel further includes:

a source driver;

a plurality of multiplexing transistors, in which one of a source and a drain of the multiplexing transistor is electrically connected to the corresponding data line;

a plurality of source lines, electrically connected to the source driver, in which the other one of the source and the drain of at least two multiplexing transistors corresponding to the sub-pixels of the same color in at least two adjacent groups of pixel units arranged along the row direction is electrically connected to a same source line; and a plurality of selection lines, in which a gate of at least two multiplexing transistors corresponding to the sub-pixels of the same color in at least two adjacent groups of pixel units arranged along the row direction is electrically connected to different selection lines.

In an embodiment, in the first mode, at least two selection lines corresponding to the sub-pixels of the same color in at least two adjacent columns of pixel units transmit a same selection signal, wherein in the second mode, at least two selection lines corresponding to the sub-pixels of the same color in at least two adjacent rows of pixel units transmit different selection signals.

In an embodiment, each gate signal includes an effective gate pulse, and the effective gate pulse is used to control a corresponding group of pixel units to be turned on, wherein a width of an effective clock pulse of a clock signal used to generate a corresponding effective gate pulse in the first mode is less than the width of the effective clock pulse in the second mode.

In an embodiment, the width of the effective clock pulse in the first mode is k times the width of the effective clock pulse in the second mode, where k is greater than 0 and less than 1, and k is related to the resolution of the first mode and the resolution of the second mode.

In an embodiment, in the first mode, the selection signal transmitted by at least two selection lines corresponding to the sub-pixels of the same color in at least two adjacent columns of pixel units is used to control at least two corresponding multiplexing transistors to be turned on persistently.

In an embodiment, in the first mode, multiple rows of pixel units arranged consecutively serve as a pixel unit group, and a plurality of pixel unit groups are scanned group by group, wherein in the second mode, the plurality of pixel units are scanned row by row, and each data line transmits a corresponding data signal.

The present invention provides a display panel and an electronic terminal, including a plurality of pixel units, arranged along a row direction and a column direction, in which the row direction intersects the column direction, and the pixel unit includes a plurality of sub-pixels of different colors arranged along the row direction, wherein in a first mode with a higher refresh rate and a lower resolution, at least two adjacent rows of pixel units are simultaneously turned on, and the sub-pixels of a same color in at least two adjacent columns of pixel units display a same gray scale, wherein in a second mode with a lower refresh rate and a higher resolution, a plurality of rows of pixel units are turned on sequentially, and each sub-pixel in a plurality of columns of pixel units displays a corresponding gray scale. In the first mode of the present invention, at least two adjacent rows of pixel units are configured to be simultaneously turned on. This avoids a plurality of rows of pixel units being turned on in a time-divisional manner and shortens the time required for all the plurality of rows of pixel units to be turned on. That is, the time required for each frame of images to be displayed can be reduced, that is, the number of frames that can be displayed within a specific period increases, and thus the refresh rate of the display panel is improved.

BRIEF DESCRIPTION OF THE DRAWINGS

The present invention will be further illustrated below by referring to appending figures. It should be noted that the appending figures described below are only some embodiments used to illustrate the present invention, and those of ordinary skill in the art can further obtain other figures according to these figures without making any inventive effort.

DETAILED DESCRIPTION

The technical solutions in the embodiments of the present invention will be clearly and completely described below with reference to accompanying drawings of the embodiments of the present invention. Obviously, the described embodiments are merely a part of embodiments of the present invention and are not all of the embodiments. Based on the embodiments of the present invention, other embodiments obtained by those of ordinary skill in the art without making any inventive effort are within the scope the present invention seeks to be protected.

In the present invention, the terms “first”, “second”, “third”, “fourth”, and so on are intended to distinguish between different objects rather than to indicate a specific order. Moreover, the terms “include”, “have” and any other variants mean to cover the non-exclusive inclusion. For example, in the context of a process, method, system, product or device that includes a series of steps or modules, the process, method, system, product or device is not necessarily limited to the listed steps or modules, instead, optionally includes other steps or modules not specified, or may optionally include inherent steps or modules of the process, method, product, or device.

The term “embodiment” or “implementation” referred to herein means that a particular feature, structure, or feature described in conjunction with the implementation may be contained in at least one implementation of the present invention. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

Embodiments of the present invention provide a display panel, which includes, but is not limited to, the following embodiments and any combination of the following embodiments.

Figure 1:
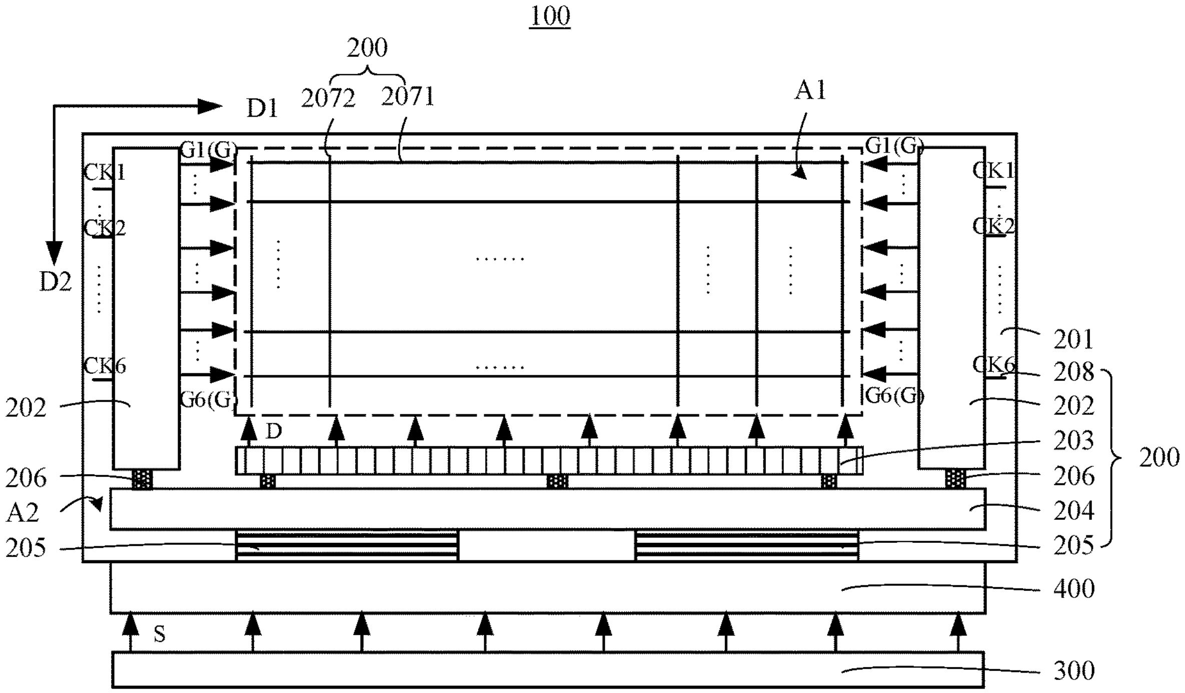
FIG. 1 is a top view of an unfolded structure of an electronic terminal in accordance with an embodiment of the present invention.
Figure 2:
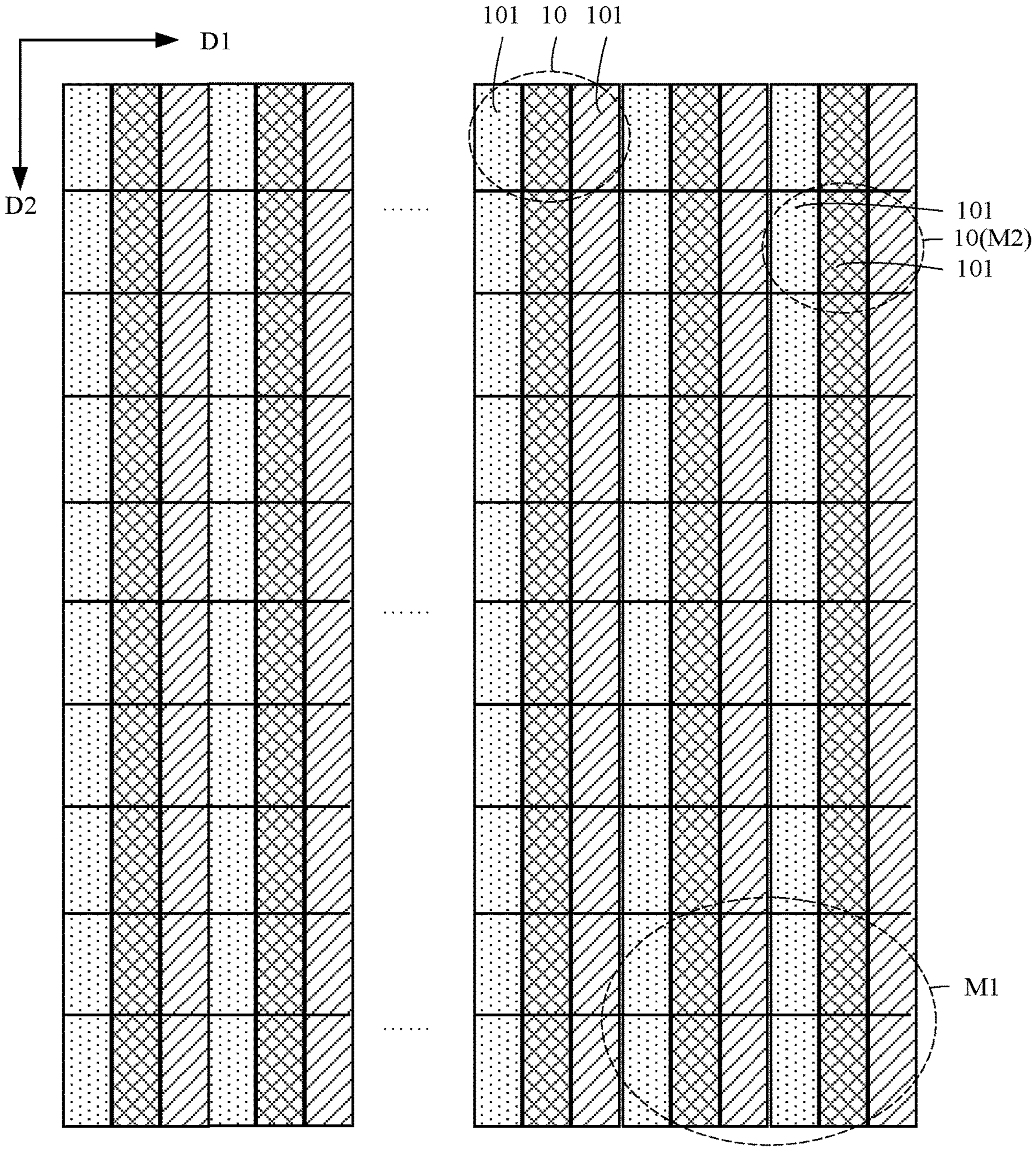
FIG. 2 is a top view of an arrangement of a plurality of pixel units in accordance with an embodiment of the present invention.

In one embodiment, referring to FIG. 1 and FIG. 2, the display panel 200 includes a plurality of pixel units 10 arranged along a row direction D1 and a column direction D2, in which the row direction D1 intersects the column direction D2, and the pixel unit 10 includes a plurality of sub-pixels 101 of different colors arranged along the row direction D1. In a first mode, at least two adjacent groups of the pixel units 10 arranged along the column direction D2 are simultaneously turned on, and at least two groups of sub-pixels 101 of a same color in at least two adjacent groups of the pixel units 10 arranged along the row direction D1 display a same gray scale.

Specifically, as shown in FIG. 1, the display panel 200 may include a panel body 201, a gate drive circuit 202 located on the panel body 201, a multiplexing circuit 203, a driving chip 204 and a flexible circuit board 205. The panel body 201 includes a display area A1 and a non-display area A2 surrounding the display area A1. The plurality of pixel units 10 are located in the display area A1. The gate drive circuit 202 is located in the non-display area A2 on the left and right sides of the display area A1 and is electrically connected to the plurality of pixel units 10. The multiplexing circuit 203 and the driving chip 204 are located in the non-display area A2 on the lower side of the display area A1. The multiplexing circuit 203 is electrically connected between the driving chip 204 and the plurality of pixel units 10. The flexible circuit board 205 is connected to a side of the driving chip 204 close to the lower side of the display panel 200. A side of the flexible circuit board 205 away from the driving chip 204 may be connected to a terminal display driving chip 300. The terminal display driving chip 300 and the display panel 200 may form a part of the structure of an electronic terminal 100.

Further, as shown in FIG. 1, the terminal display driving chip 300 may be electrically connected to the flexible circuit board 205 via an input end connector 400 so as to transmit display signals S to the driving chip 204. Further, the driving chip 204 may include a source drive module connected to the multiplexing circuit 203, and a timing control module electrically connected between the source drive module and the flexible circuit board 205. The timing control module is configured to convert the display signals S into data signals D that are to be transmitted to the multiplexing circuit 203. The multiplexing circuit 203 can transmit data representative of the data signals D to the plurality of pixel units 10 in a time-divisional manner. The driving chip 204 may be electrically connected to the multiplexing circuit 203 and the gate drive circuit 202 via conductive wires 206 so as to transmit the data signals D and gate signals G to the multiplexing circuit 203 and the gate drive circuit 202, respectively. The gate signals G are configured to control a plurality of rows of pixel units 10 to turn on sequentially, and the data signals D are configured to sequentially transmit corresponding data to the plurality of rows of pixel units 10 under the control of the gate signals G.

In the present embodiment, the row direction D1 and the column direction D2 are not limited to specific directions as long as they intersect with each other. For the purpose of illustration, here, the row direction D1 is a horizontal direction and the column direction D2 is a vertical direction. With reference to above discussion, as shown in FIG. 2 for example, the pixel unit 10 may include three sub-pixels 101 (e.g., a red sub-pixel, a green sub-pixel and a blue sub-pixel) arranged along the horizontal direction. The size or shape of the three sub-pixels 101 may be same or different. Multiple sub-pixels 101 of different colors in different pixel units 10 may be arranged in a same or a different order. For the purpose of illustration, here, multiple sub-pixels 101 of different colors in different pixel units 10 are arranged in a same order.

As shown in FIG. 2, it can be understood that the present embodiment has the first mode, and in the first mode, at least two adjacent groups of pixel units 10 (that is, two adjacent rows of pixel units 10) arranged along the column direction D2 (e.g., the vertical direction) are simultaneously turned on, that is, at least two adjacent rows of pixel units 10 can be turned on simultaneously. This avoids a plurality of rows of pixel units 10 being turned on in a time-divisional manner and shortens the time required for all the plurality of rows of pixel units 10 to be turned on. That is, the time required for each frame of images to be displayed can be reduced, that is, the number of frames that can be displayed within a specific period increases, and thus the refresh rate of the display panel 200 is improved.

Further, in the present embodiment, at least two (columns of) sub-pixels 101 of a same color in at least two adjacent groups of pixel units 10 (that is, two adjacent columns of pixel units 10) arranged along the row direction D1 (e.g., the horizontal direction) display a same gray scale. With reference to above discussion, it can be considered that for the two adjacent rows of pixel units 10 that belong to two adjacent columns of pixel units 10, every (four) sub-pixel(s) 101 of a same color display a same gray scale, that is, the color and brightness presented by four pixel units 10 arranged in a 2-by-2 matrix for example may be the same. It can also be considered that four pixel units 10 determined based on any two groups have no specific relation. In the present embodiment, the color and brightness presented by every four pixel units 10 are as the same as the color and brightness presented by any one of the four pixel units 10. This is equivalent to a use of four pixel units 10 determined in above context (as a first smallest unit M1) to express the image information individually presented by any one of the four pixel units 10, that is, the resolution is compressed to a quarter of the original. It should be noted that in the present embodiment, although the resolution undergoes half compression in the row direction D1 and the column direction D2 respectively, it can be ensured that the original image zone individually presented by a single pixel unit 10 is proportionally enlarged (that is, which is presented by four pixel units 10 in a 2-by-2 matrix). This avoids abnormal displaying caused by different compression ratios of the display image in various directions.

In one embodiment, referring to FIG. 1 and FIG. 2, in a second mode, a plurality of groups of pixel units 10 (for example, a plurality of rows of pixel units 10) arranged along the column direction D2 are sequentially turned on, and each sub-pixel 101 in a plurality of groups of pixel units 10 (for example, a plurality of columns of pixel units 10) arranged in the row direction D1 displays a corresponding gray scale. Specifically, compared with above discussion about the first mode, the present embodiment further includes the second mode, and compared with the first mode, the refresh rate of the display panel 200 is reduced (to a half of that of the first mode) because the plurality of rows of pixel units 10 are sequentially turned on. However, each sub-pixel 101 in the plurality of columns of pixel units 10 in the present embodiment can display a corresponding gray scale, that is, when each row of pixel units 10 are turned on, each sub-pixel 101 in each pixel unit 10 of that row can display a corresponding grayscale. It does not need to restrict at least two of the sub-pixels to display a same gray scale such that each pixel unit 10 can serve as a second smallest unit M2 to present corresponding color and corresponding brightness. That is, each pixel unit 10 can express its corresponding image information such that the resolution may be equal to the number of the pixel units 10.

Specifically, with reference to above discussion, in the second mode, the plurality of rows of pixel units 10 are turned on sequentially, and each sub-pixel 101 in the plurality of columns of pixel units 10 displays a corresponding gray scale. In this manner, the refresh rate of the first mode is greater than the refresh rate of the second mode, and the resolution of the first mode is smaller than the resolution of the second mode. Further, the refresh rate and the resolution of the display panel are negatively correlated.

With reference to above discussion, it can be understood that the display panel 200 of the present embodiment may have a higher resolution and a lower refresh rate in the second mode and may have a lower resolution and a higher refresh rate in the first mode. It can be selected the first mode or the second mode for image displaying, based on the demand for the refresh rate of the display panel 200, that is, the display panel 200 of the present embodiment can accommodate different refresh rates.

In one embodiment, referring to FIG. 1 and FIG. 2, the number of groups of pixel units 10 arranged along the column direction D2 is an even number, and the number of groups of pixel units 10 arranged along the row direction D1 is also an even number. In the first mode, at least a p-th group of pixel units 10 and a (p+1)-th group of pixel units 10 that are adjacent to each other and are arranged along the column direction D2 are simultaneously turned on, and at least two sub-pixels of a same color in at least a q-th group of pixel units and a (q+1)-th group of pixel units that are adjacent to each other and are arranged along the row direction display a same gray scale, where both p and q are odd numbers.

It can be understood that in the present embodiment, the display panel 200 includes even rows of pixel units 10 and includes even columns of pixel units 10, and based on this, each odd row of pixel units 10 and its next row of pixel units 10 are controlled to be turned on simultaneously, that is, the first row of pixel units 10 and the second row of pixel units 10 are turned on simultaneously, the third row of pixel units 10 and the fourth row of pixel units 10 are turned on simultaneously, and so on, until the penultimate row of pixel units 10 and the last row of pixel units 10 are turned on simultaneously, and also the image displayed by the first column of pixel units 10 can be as the same as the image displayed by the second column of pixel units 10, the image displayed by the third column of pixel units 10 can be as the same as the image displayed by the fourth column of pixel units 10, until the image displayed by the penultimate column of pixel units 10 can be as the same as the image displayed by the last column of pixel units 10. Both the first column of pixel units 10 and the second column of pixel units correspond to a same display image (called a first image), and both the third column of pixel units 10 and the fourth column of pixel units correspond to a same display image (called a second image), until both the penultimate column of pixel units 10 and the last column of pixel units correspond to a same display image (called a last image). The contents of these images are coherent, can form a whole image with great completeness and coherence, and can ensure uniform resolution everywhere for the display panel 200.

In one embodiment, referring to FIG. 1 and FIG. 2, the display panel 200 further includes: a plurality of gate lines 2071, in which each group of pixel units 10 (two adjacent rows of pixel units 10) arranged along the column direction D2 are electrically connected to corresponding gate lines 2071; and a plurality of data lines 2072, in which each sub-pixel 101 in each group of pixel units 10 (two adjacent columns of pixel units 10) arranged along the row direction D1 is electrically connected to a corresponding data line 2072. In the first mode, at least two gate lines 2071 electrically connected to at least two adjacent groups of pixel units 10 arranged along the column direction D2 respectively transmit a same gate signal G, and at least two data lines 2072 electrically connected to at least two adjacent groups of pixel units 10 arranged along the row direction D1 respectively transmit a same data signal D.

Specifically, with reference to above discussion, the gate drive circuit 202 may include a plurality of cascaded gate drive units, and each stage of the gate drive units may transmit a corresponding gate signal G to a corresponding gate line 2071 to control a corresponding row of pixel units 10 to turn on in a corresponding period. The source drive module of the driving chip 204 may transmit a corresponding data signal D to a corresponding column of sub-pixels 101 via the multiplexing circuit 203. The gate signals G and the data signals D can control a plurality of pixel units 10 to display an image. In the present embodiment, the relationship between the number of gate lines 2071 and the number of gate drive units is not limited. For example, each gate line 2071 may correspond to a gate drive unit, and for another example, each gate line 2071 in FIG. 1 may correspond to and connect with two gate drive units so as to improve signal attenuation.

With reference to above discussion, it can be understood that in the first mode of the present embodiment, for example, at least two gate lines 2071 corresponding to at least two adjacent rows of pixel units 10 transmit a same gate signal G, and this allows the at least two adjacent rows of pixel units 10 to be turned on simultaneously so as to increase the refresh rate of the display panel 200. Also, at least two data lines 2072 corresponding to at least two adjacent columns of pixel units 10 transmit a same data signal D, and this allows sub-pixels 101 of a same color in the at least two adjacent columns of pixel units 10 to display a same gray scale. This is equivalent to a use of four pixel units 10 determined based on above discussion (as a first smallest unit M1) to express the image information individually presented by any one of the pixel units 10.

In one embodiment, referring to FIG. 1 and FIG. 2, in the second mode, multiple gate lines 2071 transmit different gate signals, and each data line 2072 transmits a corresponding data signal D. Similarly, with reference to above discussion, in the second mode of the present embodiment, for example, at least two gate lines 2071 corresponding to at least two adjacent rows of pixel units 10 transmit different gate signals G, and this allows the at least two adjacent rows of pixel units 10 to be turned on in a time-divisional manner. Also, at least two data lines 2072 corresponding to at least two adjacent columns of pixel units 10 transmit corresponding data signals D, and this allows sub-pixels 101 of a same color in the at least two adjacent columns of pixel units 10 to display corresponding gray scales, respectively. In such a way, each pixel unit 10 can serve as a second smallest unit M2 to present corresponding color and corresponding brightness such that each pixel unit 10 can express corresponding image information to yield a higher resolution.

Specifically, with reference to above discussion, that is, in the first mode, multiple rows of pixel units 10 arranged consecutively serve as a pixel unit group, and a plurality of pixel unit groups are scanned group by group; and in the second mode, a plurality of pixel units 10 are scanned row by row, and each data line 2072 transmits a corresponding data signal.

In one embodiment, referring to FIG. 1 and FIG. 2, the display panel 200 further includes: the plurality of cascaded gate drive units included in the gate drive circuit 202 as mentioned above, in which the gate line 2071 mentioned above is electrically connected between a corresponding gate drive unit and a corresponding group of pixel units 10 (e.g., a corresponding row of pixel units 10); and a plurality of clock lines 208, in which the clock line 208 is electrically connected to at least a corresponding gate drive unit, and two adjacent groups of pixel units 10 (e.g., two adjacent rows of pixel units 10) arranged along the column direction D2 correspond to different clock lines 208. In the first mode, at least two clock lines 208 corresponding to at least two adjacent groups of pixel units 10 arranged along the column direction D2 transmit a same clock signal (e.g., any one of CK1 to CK6); and in the second mode, the plurality of clock lines 208 transmit different clock signals (e.g., any two of CK1 to CK6).

Figure 3:
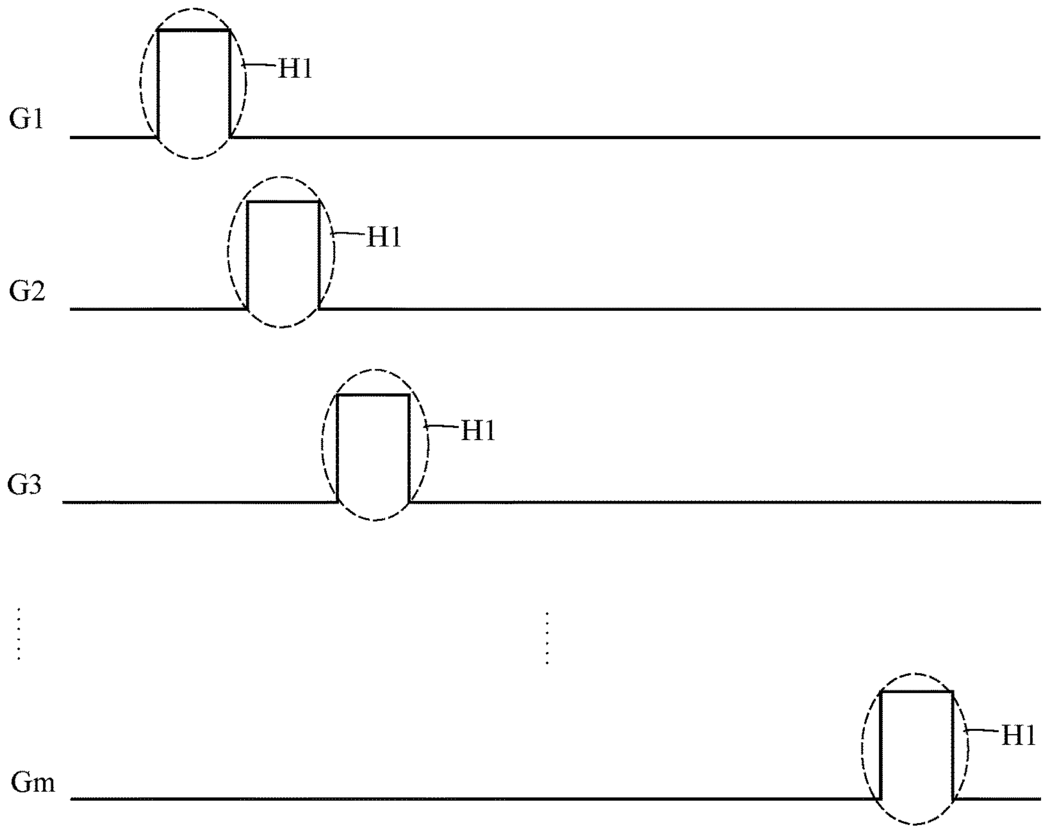
FIG. 3 is a waveform diagram of a plurality of gate signals in accordance with an embodiment of the present invention.

As discussed above, for example, two gate drive units corresponding to two adjacent rows of pixel units 10 respectively may connect to two different clock lines 208, respectively. On this basis, as shown in FIG. 1 for example, for the purpose of illustration, the plurality of clock lines 208 may include six clock lines 208 that transmit clock signals CK1, CK2, CK3, CK4, CK5 and CK6, respectively. For example, the clock line 208 that transmits the clock signal CK1 may connect to a gate drive unit whose stage satisfies (1+6*n), the clock line 208 that transmits the clock signal CK2 may connect to a gate drive unit whose stage satisfies (2+6*n), and so on, and the clock line 208 that transmits the clock signal CK5 may connect to a gate drive unit whose stage satisfies (5+6*n), and the clock line 208 that transmits the clock signal CK6 may connect to a gate drive unit whose stage satisfies (6*n), where n is 0 or a positive integer. Referring to FIG. 1 to FIG. 3, each gate signal G includes an effective gate pulse H1, and the effective gate pulse H1 is used to control a corresponding group of pixel units 10 (e.g., a row of pixel units 10) to be turned on. For the purpose of illustration, here, the number of gate lines 2071 is m, that is, m gate lines 2071 transmit a gate signal G1, a gate signal G2, . . . , and a gate signal Gm, respectively. In the second mode of the present embodiment, the periods in which the effective gate pulses H1 in different gate signals G are located are not overlapped with each other so as to realize, for example, the plurality of rows of pixel units 10 being turned on in a time-divisional manner. For example, the effective gate pulses H 1 from the gate signal G1 to the gate signal Gm are sequentially arranged in terms of time so as to control the pixel units 10 to be sequentially turned on from the first row to the last row.

Compared with the second mode discussed above, it can be understood that in the first mode of the present embodiment, for example, at least two clock lines 208 corresponding to at least two adjacent rows of pixel units 10 transmit a same clock signal (that is, the effective clock pulses H2 acting on at least two rows of pixel units 10 are located in a same period), and this allows the effective gate pulses H1 acting on at least two rows of pixel units 10 to be located in a same period, thereby realizing at least two rows of pixel units 10 being turned on simultaneously.

Figure 4:
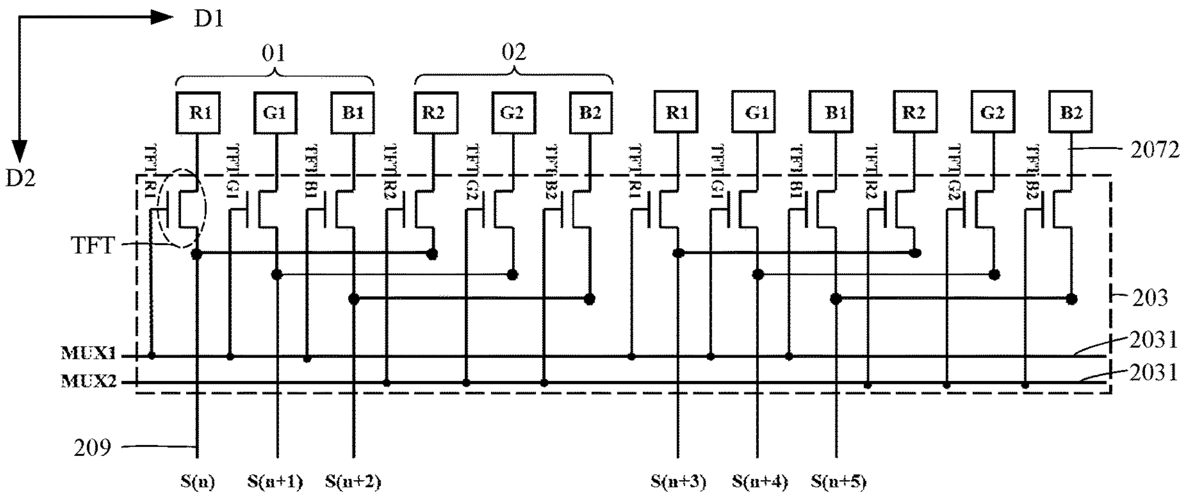
FIG. 4 is a circuit diagram of a first type of multiplexing circuit in accordance with an embodiment of the present invention.
Figure 5:
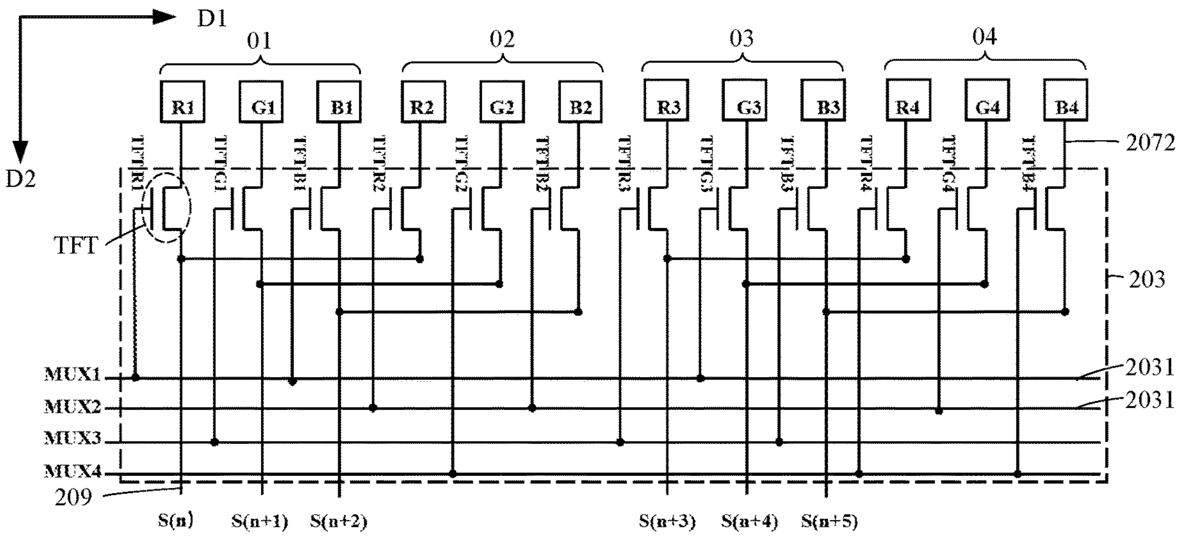
FIG. 5 is a circuit diagram of a second type of multiplexing circuit in accordance with an embodiment of the present invention.
Figure 6:
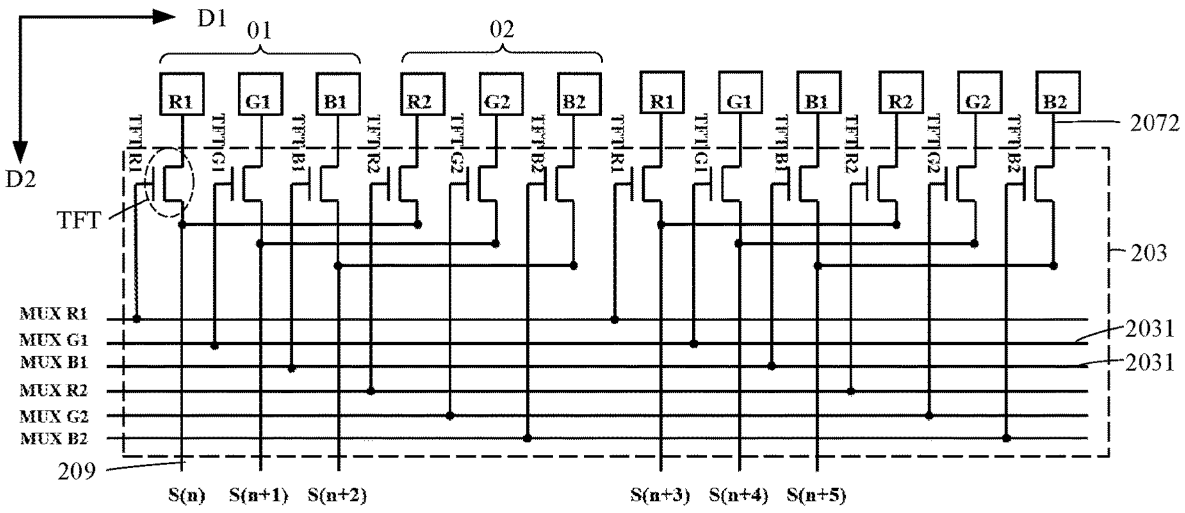
FIG. 6 is a circuit diagram of a third type of multiplexing circuit in accordance with an embodiment of the present invention.

In one embodiment, referring to FIG. 1 to FIG. 6, the display panel 200 further includes: a source driver (that is, the source drive module mentioned above, included in the driving chip 204); a plurality of multiplexing transistors TFT, in which one of a source and a drain of the multiplexing transistor TFT is electrically connected to a corresponding data line 2072 (at least including six data lines 2072 electrically connected to six columns of sub-pixels R1, G1, B1, R2, G2, B2 in two adjacent columns of pixel units 10 respectively, as shown in FIG. 4 to FIG. 6); a plurality of source lines 209, electrically connected to the source driver, in which the other one of the source and the drain of at least two multiplexing transistors TFT (i.e., TFT R1, TFT R2)

corresponding to at least two groups of sub-pixels 101 (red sub-pixel columns R1, R2) of a same color in at least two adjacent groups of pixel units 10 (e.g., the first column of pixel units 01 and the second column of pixel units 02 shown in FIG. 4 to FIG. 6) arranged along the row direction D1 is connected to a same source line 209 (i.e., S(n)); and a plurality of selection lines 2031, in which gates of at least two multiplexing transistors TFT (i.e., TFT R1, TFT R2) corresponding to at least two groups of sub-pixels 101 of a same color in at least two adjacent groups of pixel units 10 arranged along the row direction D1 are electrically connected to different selection lines 2031. In the first mode, for example, referring to FIG. 4 and FIG. 7, at least two selection lines 2031 (i.e., MUX1, MUX2) corresponding to at least two groups of sub-pixels 101 of a same color in at least two adjacent groups of pixel units 10 arranged along the row direction D1 transmit a same selection signal (i.e., mux1/2) such that two corresponding multiplexing transistors TFT (i.e., TFT R1, TFT R2) are simultaneously turned on. In the second mode, for example, referring to FIG. 4 and FIG. 8, at least two selection lines 2031 (i.e., MUX1, MUX2) corresponding to at least two groups of sub-pixels 101 of a same color in at least two adjacent groups of pixel units 10 arranged along the row direction D1 transmit different selection signals (i.e., mux1 and mux2) such that two corresponding multiplexing transistors TFT are turned on in a time-divisional manner.

Figure 7:
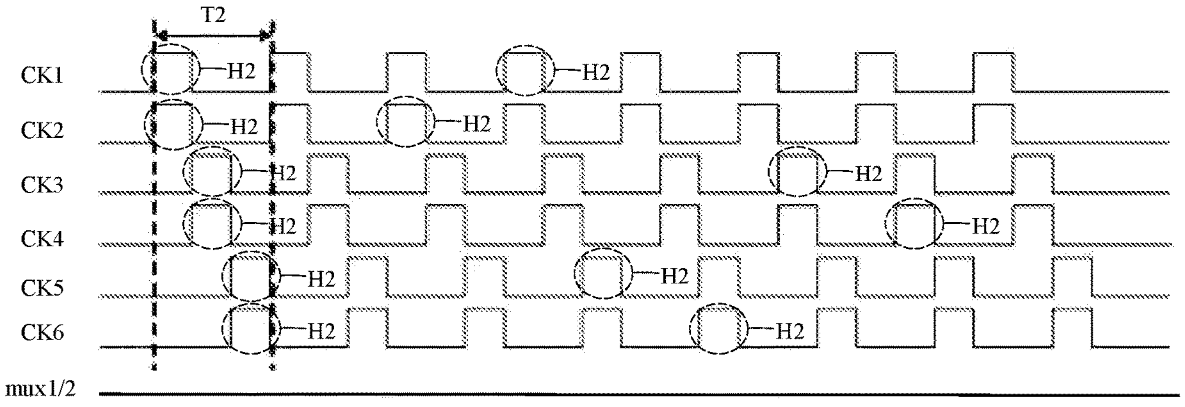
FIG. 7 is a waveform diagram of some signals of a display panel in a first mode in accordance with an embodiment of the present invention.
Figure 8:
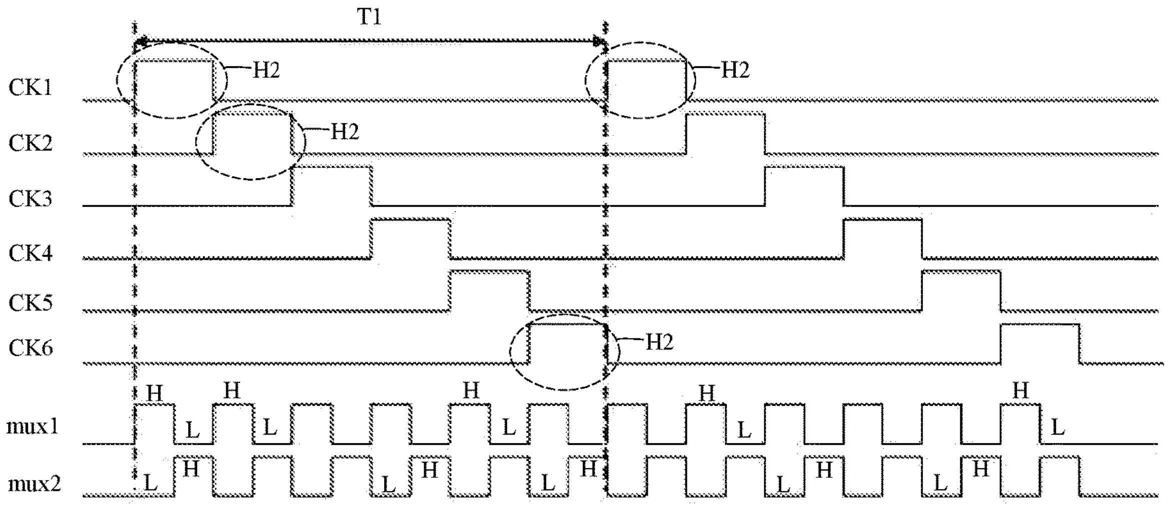
FIG. 8 is a waveform diagram of some signals of a display panel in a second mode in accordance with an embodiment of the present invention.

Specifically, for example, in FIG. 4, with reference to above discussion, for the first column of pixel units 01 and the second column of pixel units 02 that are adjacent to each other, the red sub-pixel columns R1 and R2 are connected to a same source line S(n) (likewise, S(n+3) is in similar way as S(n)) respectively via TFT R1 and TFT R2. In the first mode, as shown in FIG. 7, two selection lines (MUX1, MUX2) loaded to the gate of TFT R1 and the gate of TFT R2 respectively transmit a same selection signal (mux1/2). Further, since multiple gate signals G have the function of turning on multiple rows of pixel units 10 sequentially, the selection signal mux1/2 can be a constant electrical signal so as to control TFT R1 and TFT R2 to be turned on all the time such that the source line S(n) always loads a same data signal D to the red sub-pixel columns R1 and R2. For example, with reference to FIG. 2 and above discussion, it can be realized that each of the (four) sub-pixels 101 of a same color in two adjacent columns and two adjacent rows of pixel units 10 as determined above displays a same gray scale, thereby increasing the refresh rate of the display panel 200. In the second mode, as shown in FIG. 8, two selection lines (MUX1, MUX2) transmit different selection signals mux1, mux2. Further, in mux1 and mux2, high voltage level H or low voltage level L used to turn on a corresponding multiplexing transistor TFT (TFT R1 or TFT R2) may dominate alternately in terms of time such that two corresponding multiplexing transistors TFT (TFT R1, TFT R2) are turned on in a time-divisional manner. It can be realized that each sub-pixel 101 in each pixel unit 10 displays a corresponding gray scale, thereby achieving a higher resolution.

Similarly, the green sub-pixel columns G1 and G2 are connected to a same source line S(n+1) (likewise, S(n+4) is in a similar way as S(n+1)) respectively via TFT G1 and TFT G2, and the blue sub-pixel columns B1 and B2 are connected to a same source line S(n+2) (likewise, S(n+5) is in a similar way as S(n+2)) respectively via TFT B1 and TFT B2. For the sub-pixel columns of aforesaid two colors, it may refer to related description on the red sub-pixel column described above.

Specifically, for example, in FIG. 5, for the first column of pixel units 01 and the second column of pixel units 02 that are adjacent to each other, the red sub-pixel columns R1 and R2 are connected to a same source line S(n) respectively via TFT R1 and TFT R2, the green sub-pixel columns G1 and G2 are connected to a same source line S(n+1) respectively via TFT G1 and TFT G2, and the blue sub-pixel columns B1 and B2 are connected to a same source line S(n+2) respectively via TFT B1 and TFT B2. In the first mode, likewise, two selection lines (MUX1, MUX2) loaded to the gate of TFT R1 and the gate of TFT R2 respectively may transmit a same selection signal, two selection lines (MUX3, MUX4) loaded to the gate of TFT G1 and the gate of TFT G2 respectively may transmit a same selection signal, and two selection lines (MUX1, MUX2) loaded to the gate of TFT B1 and the gate of TFT B2 respectively may transmit a same selection signal. Therefore, the source line S(n) always loads a same data signal D to the red sub-pixel columns R1 and R2, the source line S(n+1) always loads a same data signal D to the green sub-pixel columns G1 and G2, and the source line S(n+2) always loads a same data signal D to the blue sub-pixel columns B1 and B2. For example, with reference to FIG. 2 and above discussion, it can be realized that each of the (four) sub-pixels 101 of a same color in two adjacent columns and two adjacent rows of pixel units 10 as determined above displays a same gray scale, thereby increasing the refresh rate of the display panel 200. In the second mode, likewise, in the different selection signals transmitted by two selection lines (MUX1, MUX2), high voltage level H or low voltage level L used to turn on a corresponding multiplexing transistor TFT (e.g., TFT R1 or TFT R2) may dominate alternately in terms of time such that two corresponding multiplexing transistors TFT (i.e., TFT R1, TFT R2) are turned on in a time-divisional manner. It can be realized that each sub-pixel 101 in each pixel unit 10 displays a corresponding gray scale, thereby achieving a higher resolution.

A first group of selection lines (MUX1, MUX2) and a second group of selection lines (MUX3, MUX4) may be used alternately by sub-pixel columns 101 of a same color arranged along the row direction D1 (for example, in the first column of pixel units 01 and second column of pixel units 02, two red sub-pixel columns (R1 and R2), two green sub-pixel columns (G1 and G2), and two blue sub-pixel columns (B1 and B2) use the first group of selection lines, the second group of selection lines and the first group of selection lines, respectively), and so on. For a third column of pixel units 03 and a fourth column of pixel units 04 that are adjacent to each other in a next group, the red sub-pixel columns R3 and R4 are connected to a same source line S(n+3) respectively via TFT R3 and TFT R4, the green sub-pixel columns G3 and G4 are connected to a same source line S(n+4) respectively via TFT G3 and TFT G4, and the blue sub-pixel columns B3 and B4 are connected to a same source line S(n+5) respectively via TFT B3 and TFT B4, that is, the manner of connection to the multiplexing circuit 203 by the first column of pixel units 01, the second column of pixel units 02, the third column of pixel units 03 and the fourth column of pixel units 04 may serve as a smallest repeating unit.

Specifically, for example, in FIG. 6, for the first column of pixel units 01 and the second column of pixel units 02 that are adjacent to each other, the red sub-pixel columns R1 and R2 are connected to a same source line S(n) respectively via TFT R1 and TFT R2, the green sub-pixel columns G1 and G2 are connected to a same source line S(n+1) respectively via TFT G1 and TFT G2, and the blue sub-pixel columns B1 and B2 are connected to a same source line S(n+2) respectively via TFT B1 and TFT B2. In the first mode, likewise, two selection lines (MUX R1, MUX R2) loaded to the gate of TFT R1 and the gate of TFT R2 respectively may transmit a same selection signal, two selection lines (MUX G1, MUX G2) loaded to the gate of TFT G1 and the gate of TFT G2 respectively may transmit a same selection signal, and two selection lines (MUX B1, MUX B2) loaded to the gate of TFT B1 and the gate of TFT B2 respectively may transmit a same selection signal. Therefore, the source line S(n) always loads a same data signal D to the red sub-pixel columns R1 and R2, the source line S(n+1) always loads a same data signal D to the green sub-pixel columns G1 and G2, and the source line S(n+2) always loads a same data signal D to the blue sub-pixel columns B1 and B2. For example, with reference to FIG. 2 and above discussion, it can be realized that each of the (four) sub-pixels 101 of a same color in two adjacent columns and two adjacent rows of pixel units 10 as determined above displays a same gray scale, thereby increasing the refresh rate of the display panel 200. In the second mode, likewise, in the different selection signals transmitted by two selection lines 2031 (MUX R1, MUX R2), high voltage level or low voltage level used to turn on a corresponding multiplexing transistor TFT (e.g., TFT R1 or TFT R2) may dominate alternately in terms of time such that two corresponding multiplexing transistors TFT (i.e., TFT R1, TFT R2) are turned on in a time-divisional manner. It is similar for the two selection lines (MUX B1, MUX B2) and the two selection lines (MUX G1, MUX G2). It can be realized that each sub-pixel 101 in each pixel unit 10 displays a corresponding gray scale, thereby achieving a higher resolution.

With reference to above discussion about the embodiments shown in FIG. 4 to FIG. 6, it can be known that in the first mode, the selection signals transmitted by at least two selection lines 2031 of at least two sub-pixels 101 of a same color in at least two adjacent groups of pixel units 10 arranged along the row direction D1 are constant electrical signals (e.g., the constant electrical signals used to control TFT R1 and TFT R2 to be turned on all the time as mentioned above). The constant electrical signals here may be understood as the signals used to control at least two corresponding multiplexing transistors to be turned on persistently.

It should be noted that from a comparison on the embodiments shown in FIG. 4 to FIG. 6, it can be seen that compared to FIG. 4, the embodiments shown in FIG. 5 and FIG. 6 utilize at least two groups of selection signals 2031 to connect a plurality of multiplexing transistors TFT. Differentiated control may be applied to the selection signals transmitted on different groups of selection lines 2031 so as to match the voltages required by turning on or off the plurality of multiplexing transistors TFT, thereby improving the reliability and accuracy of the multiplexing circuit 203.

Specifically, with reference to above discussion, as shown in FIG. 1 to FIG. 8, it can be realized that the effective gate pulses H1 of a plurality of gate signals G(1+6*i) to G(6+6*i) transmitted respectively by a plurality of gate lines 2071 that are controlled by clock signals CK1, CK2, CK3, CK4, CK5 and CK6 and are arranged consecutively are sequentially arranged in terms of time, where i is 0 or a positive integer. Further, with reference to the circuit structure and corresponding gate signals G in the gate drive units, referring to FIG. 3 and FIG. 4, each clock signal (any one of CK1, CK2, CK3, CK4, CK5 and CK6) may include a plurality of effective clock pulses H2, and the effective clock pulses H2 are used to generate corresponding effective gate pulses H1 in the gate signals G. Since the multi-stage gate drive units are cascaded, the multi-stage gate drive units electrically connected to a same clock line 208 is effected by different effective clock pulses H2 in a corresponding clock signal, that is, a j-th effective clock pulse H2 of a clock signal (any one of CK1, CK2, CK3, CK4, CK5 and CK6) acts on a j-th gate drive unit in the corresponding multi-stage gate drive units, where j is a positive integer.

It should be noted that as shown in FIG. 8, in the second mode, since two selection signals (mux1, mux2) in a same group of selection signals include high voltage level H and low voltage level L that dominates alternatively, for example, the high voltage level H is used to control the multiplexing transistor TFT to be turned on, the effective clock pulses H2 in a corresponding clock signal needs to keep the period of this high voltage level H in one of the corresponding selection signals (e.g., mux1) plus the period of this high voltage level H in the other one of the corresponding selection signals (e.g., mux2) so as to ensure that data signals D can be loaded to two corresponding columns of sub-pixels 101 sequentially. As shown in FIG. 7, in the first mode, since one selection signal mux1/2 is adopted to control at least two corresponding multiplexing transistors TFT to be turned on, that is, a data signal D can be loaded to at least two corresponding columns of sub-pixels 101 simultaneously, there is no need for the effective gate pulses H1 to satisfy the requirements of the second mode.

Therefore, with reference to above discussion, referring to FIG. 7 and FIG. 8, the width of the effective clock pulse H2 of the clock signal used to generate a corresponding effective gate pulse H1 in the first mode is less than the width of the effective clock pulse H2 in the second mode such that in the first mode the time required to turn on each row of pixel units 10 (that is, the effective gate pulse H1) can be further reduced, and in this way the refresh rate of the display panel 200 can further increase.

Specifically, the width of the effective clock pulse H2 in the first mode is k times the width of the effective clock pulse H2 in the second mode, where k is greater than 0 and less than 1, and k is related to the resolution of the first mode and the resolution of the second mode. For example, as shown in FIG. 7 and FIG. 8, the width of the effective clock pulse H2 in the first mode may be half of the width of the effective clock pulse H2 in the second mode such that the time required to turn on each row of pixel units 10 (that is, the effective gate pulse H1) is further reduced to a half. This can further double the refresh rate of the display panel 200. That is, compared to FIG. 8, in FIG. 7, the time (T2 is compared to T1) required for six clock signals (CK1, CK2, CK3, CK4, CK5 and CK6) control a group of six gate signals to turn on sequentially can be reduced to ¼, and in this way the refresh rate of the display panel 200 can increase by 4 times.

An embodiment of the present invention provides an electronic terminal. Referring to above discussion about FIG. 1 to FIG. 8, the electronic terminal 100 may include the display panel 200 described in any one of above embodiments.

The present invention provides a display panel and an electronic terminal, including a plurality of pixel units, arranged along a row direction and a column direction, in which the row direction intersects the column direction, and the pixel unit includes a plurality of sub-pixels of different colors arranged along the row direction, wherein in a first mode with a higher refresh rate and a lower resolution, at least two adjacent rows of pixel units are simultaneously turned on, and the sub-pixels of a same color in at least two adjacent columns of pixel units display a same gray scale, wherein in a second mode with a lower refresh rate and a higher resolution, a plurality of rows of pixel units are turned on sequentially, and each sub-pixel in a plurality of columns of pixel units displays a corresponding gray scale. In the first mode of the present invention, at least two adjacent rows of pixel units are configured to be simultaneously turned on. This avoids a plurality of rows of pixel units being turned on in a time-divisional manner and shortens the time required for all the plurality of rows of pixel units to be turned on. That is, the time required for each frame of images to be displayed can be reduced, that is, the number of frames that can be displayed within a specific period increases, and thus the refresh rate of the display panel is improved.

Hereinbefore, the display panel and the electronic terminal provided in the embodiments of the present invention are introduced in detail, the principles and implementations of the present invention are set forth herein with reference to specific examples, descriptions of the above embodiments are merely served to assist in understanding the technical solutions and essential ideas of the present invention. Those having ordinary skill in the art should understand that they still can modify technical solutions recited in the aforesaid embodiments or equivalently replace partial technical features therein; these modifications or substitutions do not make essence of corresponding technical solutions depart from the scope of technical solutions of embodiments of the present invention.

What is claimed is:

1. A display panel, comprising:

a plurality of pixel units, arranged along a row direction and a column direction, in which the row direction intersects the column direction, and the pixel unit comprises a plurality of sub-pixels of different colors arranged along the row direction, a plurality of gate lines, in which each row of pixel units are electrically connected to a corresponding gate line;

a plurality of data lines, in which each sub-pixel in each column of pixel units is electrically connected to a corresponding data line;

a source driver;

a plurality of multiplexing transistors, in which one of a source and a drain of the multiplexing transistor is electrically connected to the corresponding data line;

a plurality of source lines, electrically connected to the source driver, in which the other one of the source and the drain of at least two multiplexing transistors corresponding to the sub-pixels of the same color in at least two adjacent groups of pixel units arranged along the row direction is electrically connected to a same source line; and a plurality of selection lines, in which a gate of at least two multiplexing transistors corresponding to the sub-pixels of the same color in at least two adjacent groups of pixel units arranged along the row direction is electrically connected to different selection lines, wherein in a first mode, at least two adjacent rows of pixel units are simultaneously turned on, and the sub-pixels of a same color in at least two adjacent columns of pixel units display a same gray scale, wherein in the first mode, at least two adjacent gate lines transmit a same gate signal, and at least two adjacent data lines transmit a same data signal, wherein in a second mode, the plurality of rows of pixel units are turned on sequentially, and each sub-pixel in a plurality of columns of pixel units displays a corresponding gray scale, wherein a refresh rate of the first mode is greater than the refresh rate of the second mode, and a resolution of the first mode is smaller than the resolution of the second mode.

2. The display panel according to claim 1, wherein the refresh rate and the resolution of the display panel are negatively correlated.

3. The display panel according to claim 1, wherein in the first mode, at least two selection lines corresponding to the sub-pixels of the same color in at least two adjacent columns of pixel units transmit a same selection signal, wherein in the second mode, at least two selection lines corresponding to the sub-pixels of the same color in at least two adjacent rows of pixel units transmit different selection signals.

4. The display panel according to claim 3, wherein each gate signal comprises an effective gate pulse, and the effective gate pulse is used to control a corresponding group of pixel units to be turned on, wherein a width of an effective clock pulse of a clock signal used to generate a corresponding effective gate pulse in the first mode is less than the width of the effective clock pulse in the second mode.

5. The display panel according to claim 4, wherein the width of the effective clock pulse in the first mode is k times the width of the effective clock pulse in the second mode, where k is greater than 0 and less than 1, and k is related to the resolution of the first mode and the resolution of the second mode.

6. The display panel according to claim 3, wherein in the first mode, the selection signal transmitted by at least two selection lines corresponding to the sub-pixels of the same color in at least two adjacent columns of pixel units is used to control at least two corresponding multiplexing transistors to be turned on persistently.

7. The display panel according to claim 1, wherein in the first mode, multiple rows of pixel units arranged consecutively serve as a pixel unit group, and a plurality of pixel unit groups are scanned group by group, wherein in the second mode, the plurality of pixel units are scanned row by row, and each data line transmits a corresponding data signal.

8. The display panel according to claim 7, further comprising:

a plurality of cascaded gate drive units, in which the gate line is electrically connected between a corresponding gate drive unit and a corresponding pixel unit; and a plurality of clock lines, in which the clock line is electrically connected to at least one corresponding gate drive unit, and two adjacent rows of pixel units correspond to different clock lines, wherein in the first mode, at least two clock lines corresponding to at least two adjacent rows of pixel units transmit a same clock signal, wherein in the second mode, the plurality of clock lines transmit different clock signals.

9. The display panel according to claim 1, wherein a total number of rows of pixel units is an even number, and a total number of columns of pixel units is an even number, wherein in the first mode, at least a p-th row of pixel units and a (p+1)-th row of pixel units that are adjacent to each other are simultaneously turned on, and at least two sub-pixels of the same color in at least a q-th column of pixel units and a (q+1)-th column of pixel units that are adjacent to each other display the same gray scale, where both p and q are odd numbers.

10. An electronic terminal, comprising a display panel, which comprises:

a plurality of pixel units, arranged along a row direction and a column direction, in which the row direction intersects the column direction, and the pixel unit comprises a plurality of sub-pixels of different colors arranged along the row direction;

a plurality of gate lines, in which each row of pixel units are electrically connected to a corresponding gate line;

a plurality of data lines, in which each sub-pixel in each column of pixel units is electrically connected to a corresponding data line;

a source driver;

a plurality of multiplexing transistors, in which one of a source and a drain of the multiplexing transistor is electrically connected to the corresponding data line;

a plurality of source lines, electrically connected to the source driver, in which the other one of the source and the drain of at least two multiplexing transistors corresponding to the sub-pixels of the same color in at least two adjacent groups of pixel units arranged along the row direction is electrically connected to a same source line; and a plurality of selection lines, in which a gate of at least two multiplexing transistors corresponding to the sub-pixels of the same color in at least two adjacent groups of pixel units arranged along the row direction is electrically connected to different selection lines, wherein in a first mode, at least two adjacent rows of pixel units are simultaneously turned on, and the sub-pixels of a same color in at least two adjacent columns of pixel units display a same gray scale, wherein in the first mode, at least two adjacent gate lines transmit a same gate signal, and at least two adjacent data lines transmit a same data signal, wherein in a second mode, the plurality of rows of pixel units are turned on sequentially, and each sub-pixel in a plurality of columns of pixel units displays a corresponding gray scale, wherein a refresh rate of the first mode is greater than the refresh rate of the second mode, and a resolution of the first mode is smaller than the resolution of the second mode.

11. The electronic terminal according to claim 10, wherein the refresh rate and the resolution of the display panel are negatively correlated.

12. The electronic terminal according to claim 10, wherein in the first mode, at least two selection lines corresponding to the sub-pixels of the same color in at least two adjacent columns of pixel units transmit a same selection signal, wherein in the second mode, at least two selection lines corresponding to the sub-pixels of the same color in at least two adjacent rows of pixel units transmit different selection signals.

13. The electronic terminal according to claim 12, wherein each gate signal comprises an effective gate pulse, and the effective gate pulse is used to control a corresponding group of pixel units to be turned on, wherein a width of an effective clock pulse of a clock signal used to generate a corresponding effective gate pulse in the first mode is less than the width of the effective clock pulse in the second mode.

14. The electronic terminal according to claim 13, wherein the width of the effective clock pulse in the first mode is k times the width of the effective clock pulse in the second mode, where k is greater than 0 and less than 1, and k is related to the resolution of the first mode and the resolution of the second mode.

15. The electronic terminal according to claim 12, wherein in the first mode, the selection signal transmitted by at least two selection lines corresponding to the sub-pixels of the same color in at least two adjacent columns of pixel units is used to control at least two corresponding multiplexing transistors to be turned on persistently.

16. The electronic terminal according to claim 10, wherein in the first mode, multiple rows of pixel units arranged consecutively serve as a pixel unit group, and a plurality of pixel unit groups are scanned group by group, wherein in the second mode, the plurality of pixel units are scanned row by row, and each data line transmits a corresponding data signal.

17. A display panel, comprising: a plurality of pixel units, arranged along a row direction and a column direction, in which the row direction intersects the column direction, and the pixel unit comprises a plurality of sub-pixels of different colors arranged along the row direction; a plurality of gate lines, in which each row of pixel units are electrically connected to a corresponding gate line; and a plurality of data lines, in which each sub-pixel in each column of pixel units is electrically connected to a corresponding data line, a plurality of cascaded gate drive units, in which the gate line is electrically connected between a corresponding gate drive unit and a corresponding pixel unit; and a plurality of clock lines, in which the clock line is electrically connected to at least one corresponding gate drive unit, and two adjacent rows of pixel units correspond to different clock lines, wherein in a first mode, at least two adjacent rows of pixel units are simultaneously turned on, and the sub-pixels of a same color in at least two adjacent columns of pixel units display a same gray scale, wherein in the first mode, at least two adjacent gate lines transmit a same gate signal, and at least two adjacent data lines transmit a same data signal, wherein in the first mode, multiple rows of pixel units arranged consecutively serve as a pixel unit group, and a plurality of pixel unit groups are scanned group by group, wherein in the first mode, at least two clock lines corresponding to at least two adjacent rows of pixel units transmit a same clock signal, wherein in a second mode, the plurality of rows of pixel units are turned on sequentially, and each sub-pixel in a plurality of columns of pixel units displays a corresponding gray scale, wherein in the second mode, the plurality of pixel units are scanned row by row, and each data line transmits a corresponding data signal, wherein in the second mode, the plurality of clock lines transmit different clock signals, wherein a refresh rate of the first mode is greater than the refresh rate of the second mode, and a resolution of the first mode is smaller than the resolution of the second mode.

18. The display panel according to claim 7, further comprising:

a source driver;

a plurality of multiplexing transistors, in which one of a source and a drain of the multiplexing transistor is electrically connected to the corresponding data line;

a plurality of source lines, electrically connected to the source driver, in which the other one of the source and the drain of at least two multiplexing transistors corresponding to the sub-pixels of the same color in at least two adjacent groups of pixel units arranged along the row direction is electrically connected to a same source line; and a plurality of selection lines, in which a gate of at least two multiplexing transistors corresponding to the sub-pixels of the same color in at least two adjacent groups of pixel units arranged along the row direction is electrically connected to different selection lines.

* * * * *